United States Patent
Kazama et al.

(10) Patent No.: US 6,285,101 B1
(45) Date of Patent: Sep. 4, 2001

(54) ROTATIONAL ANGLE DETECTOR FOR BRUSHLESS MOTOR AND BRUSHLESS MOTOR USING THE DETECTOR

(75) Inventors: Noriaki Kazama, Sendai; Tetsuya Katsumi, Miyagi-ken; Hideki Takeda; Yoshinori Miura, both of Sendai, all of (JP)

(73) Assignees: YKK Corporation, Tokyo; Mitec Corporation, Miyagi-ken, both of (JP)

( * ) Notice: Subject to any disclaimer, the term of this patent is extended or adjusted under 35 U.S.C. 154(b) by 0 days.

(21) Appl. No.: 09/648,747

(22) Filed: Aug. 28, 2000

Related U.S. Application Data

(62) Division of application No. 09/342,250, filed on Jun. 29, 1999.

(30) Foreign Application Priority Data

Jun. 30, 1998 (JP) ................................. 10-198093

(51) Int. Cl.[7] .................................................. H02K 11/00
(52) U.S. Cl. ................. 310/68 B; 310/68 C; 310/68 R; 324/252
(58) Field of Search ............................... 310/68 B, 68 C, 310/67 R, 68 R; 360/113, 125; 324/252, 235

(56) References Cited

U.S. PATENT DOCUMENTS

| | | | |
|---|---|---|---|
| 4,639,806 | * | 1/1987 | Kira et al. ............................. 360/113 |
| 5,589,278 | * | 12/1996 | Kamijo ................................. 428/661 |
| 5,982,177 | * | 11/1999 | Cadieu ................................. 324/252 |
| 5,998,040 | * | 12/1999 | Nakatani et al. ..................... 428/611 |

* cited by examiner

Primary Examiner—Elvin Enad
Assistant Examiner—Thanh Lam
(74) Attorney, Agent, or Firm—Finnegan, Henderson, Farabow, Garrett, & Dunner, L.L.P.

(57) ABSTRACT

A detector for the rotational angle of a motor and a small brushless or stepping motor having the detector built therein are disclosed. A sensor probe of the detector is provided with a wire configuration comprising a giant magnetoresistive element (sensor element) enabled to read a change in magnetic field up to at least 10 kOe, a first sensor lead and a second sensor lead connected one each to the opposite terminals of the magnetoresistive element, and an insulating layer interposed between the two sensor leads. The sensor probe of the detector is disposed inside a motor housing as approximated closely to the magnetic teeth of a rotor of the motor. The giant magnetoresistive element is formed of a magnetic particle dispersion type giant magnetoresistive material, an artificial lattice type giant magnetoresistive material, or a colossal magnetoresistive material.

18 Claims, 10 Drawing Sheets

10 Hz

60 Hz

100 Hz

300 Hz

500 Hz 1 k Hz

3k Hz

ROTATIONAL ANGLE DETECTOR FOR BRUSHLESS MOTOR AND BRUSHLESS MOTOR USING THE DETECTOR

This is a division of application Ser. No. 09/342,250, filed Jun. 29, 1999, which is incorporated herein by reference.

BACKGROUND OF THE INVENTION

1. Field of the Invention

This invention relates to a rotational angle detector provided with a giant magnetoresistive element and a brushless or stepping motor using the detector.

2. Description of the Prior Art

The growth of the semiconductor technology and the digital technology in recent years has been encouraging all the industrial devices to succumb to digitalization and has been promoting the adoption of microcomputers therefor. Since motors which are capable of producing a digital positioning action are suitable as driving sources for these devices, stepping motors and servo motors have been heretofore used therefor. Likewise in the field of such applications as factory automation (FA) and robot, stepping motors which are smaller in size and larger in torque are used.

A conventional brushless or stepping motor (permanent magnet (PM) type stepping motor) 10, as illustrated in FIG. 1 and FIG. 2, is composed of a magnetic rotor (hereinafter referred to as "rotor") 12 formed of a permanent magnet and accommodated rotatably in a housing 11, exciting coils 14 disposed around the rotor 12 as opposed thereto across a prescribed gap, and rotational angle detecting magnetic sensors 15 interposed between the exciting coils 14. By orderly exciting the exciting coils 14 externally, the rotor 12 is caused to change the position thereof depending on the state of coil electrization and produce a stepping motion, with the result that the angle of rotation and the speed of rotation will be controlled with the signal of excitation. It is not deniable, however, that the rotor 12 will possibly fail to rotate in spite of the excitation of the coils 14 on account of an unduly large load on the rotor 12. For exact control of the rotational angle of the rotor 12, therefore, a measure to use the magnetic sensors (Hall sensors) 15 for detecting changes in magnetic field of magnetized teeth 13 of the rotor 12 made of permanent magnet as the rotational angles or a measure to detect the rotational angles by the use of an encoder disposed outside the motor is resorted to.

In the miniaturization of the brushless or stepping motor, the permanent magnet rotor 12 provided with a plurality of magnetized teeth 13 and the housing 11 encompassing the exciting coils 14 can be miniaturized. The intervals between the individual teeth 13 of the rotor 12 of permanent magnet constructed as illustrated in FIG. 2 can be decreased to the order of some tens of μm and, therefore, pose no problem to the miniaturization of the brushless motor. In the case of an application which requires the brushless motor to control the number of revolutions and the angle of rotation exactly, however, the miniaturization of this motor has its own limit because the Hall sensors 15 serving to detect the rotational angle cannot be reduced in size. The Hall sensors 15 each require at least four sensor leads (two voltage terminals 16a, 16b and two current terminals 17a, 171b) as illustrated in FIG. 3 (the detection magnetic field perpendicular to the face of the paper in the bearings of FIG. 3) and, therefore, entail as an inherent problem the noise of induced electromotive force due to a change in the magnetic field generated by the lead wires. Further, since the Hall sensors are unserviceable at elevated temperatures exceeding 100° C. and since they are exposed, when operated in the stepping motor which usually gains in temperature while passing electric current, to such elevated temperatures, they are required to take into consideration the necessity for using a proper cooling means.

To overcome the problem, therefore, the idea of utilizing a magnetoresistive sensor 18 for which two sensor leads (current terminals 19a, 19b) suffice as illustrated in FIG. 4 (the detection magnetic field in an arbitrary direction) may be conceived.

The term "magnetoresistance (MR) effect" as used herein means a phenomenon that the electric resistance offered by a given material is varied by applying a magnetic field to that material. Generally, a ferromagnetic material is used as an MR element. A CoFe alloy having a rate of change of about 5% and a permalloy having a rate of change of about 2%, in magnetoresistance, are typical examples of the MR element. The rate of change of the magnetoresistance effect (magnetoresistance ratio, MR ratio) is expressed by the following formula (1):

$$\text{Magnetoresistance ratio}(\%) = [R(O) - R(H)]/R(O) \times 100 \qquad (1)$$

wherein R(O) represents the electric resistance in the absence of a magnetic field and R(H) represents the electric resistance in the presence of application of a magnetic field.

The utilization of the magnetoresistance effect is effective in realizing miniaturization of an angle detecting device as by reducing the number of necessary sensor leads to two and simplifying the layout of wires, for example. Examples of the motor which uses a rotational angle sensor utilizing the magnetoresistance effect are disclosed in published Japanese Patent Applications, KOKAI (Early Publication) No. 62-2353 and No. 8-289518. Since the brushless or stepping motor uses a magnet (having a surface magnetic field of not less than 100 [Oe]) as a rotor thereof and the exciting coil thereof for driving the rotor has a strong magnetic field (some hundreds of Oe), however, the sensor which utilizes a magnetoresistive element formed of a soft magnetic material represented by permalloy has the problem that it cannot detect the rotational angle because its detectable magnetic field (not more than some tens of Oe) is surpassed.

SUMMARY OF THE INVENTION

The rotational angle sensor for use in the small brushless or stepping motor described above is required to fulfill the following four requirements. The sensors of the conventional class, however, have the problem that none of them cannot satisfy all these requirements.

(1) The sensor should be capable of being easily miniaturized (miniaturization).

(2) The sensor should not suffer the detecting sensitivity of the magnetic field thereof to vary notably with temperature (temperature characteristic).

(3) The sensor should be capable of detecting a magnetic field of up to several kOe (magnetic field characteristic).

(4) The sensor should be capable of detecting an AC magnetic field of up to several kHz (frequency characteristic).

To satisfy these requirements, in accordance with one aspect of the present invention, there is provided a rotational angle detector for use in a brushless or stepping motor which comprises a detecting part of a wiring configuration having superposed through the medium of an insulating layer two sensor leads connected one each to the opposite terminals of a giant magnetoresistive element.

In accordance with another aspect of the present invention, there is provided a brushless or stepping motor which, by having the giant magnetoresistive element of the detector capable of reading a change in magnetic field of up to at least 10 kOe built in a motor housing as approximated closely to the magnetic teeth of a rotor of high magnetic field (some hundreds of Oe to several kOe), enables the giant magnetoresistive element to read directly the rotational angle of the rotor.

The giant magnetoresistive element mentioned above is formed of a magnetic particle dispersion type giant magnetoresistive material, an artificial lattice type giant magnetoresistive material, or a colossal magnetoresistive material and is capable of reading an AC magnetic field of at least not less than 5 kHz as a signal.

Preferably, the giant magnetoresistive element mentioned above is a magnetic particle dispersion type giant magnetoresistive element which is formed of a material having ferromagnetic particles, 5 to 500 nm in maximum major diameter, dispersed in a nonmagnetic (paramagnetic or diamagnetic) material. It may be otherwise an artificial lattice type giant magnetoresistive element which is formed of a material having a nonmagnetic (paramagnetic or diamagnetic) material and a ferromagnetic material, each having a thickness of about 10 nm, for example, alternately superposed.

In a preferred embodiment, the detector mentioned above may be provided, for the purpose of allaying the influence of magnetic field to be received from the exciting coil serving to drive rotation, with two giant magnetoresistive elements disposed as separated by an interval equivalent to (2n+1)/2, wherein n represents an integer inclusive of 0, of the pitch of the magnetic teeth of the rotor and consequently enabled to detect the differential signal of these two giant magnetoresistive elements as the rotational angle. Further, the detecting part of the detector mentioned above may be provided, for the purpose of reducing the noise of the lead wires due to a change in magnetic field, with a wiring configuration having superposed through the medium of an insulating layer two sensor leads connected one each to the opposite terminals of a giant magnetoresistive element.

According to the mode of one preferred embodiment, the detecting part mentioned above comprises an elongate first sensor lead formed in the form of a film on a substrate, an insulating layer superposed in a covering manner on the first sensor lead, an elongate second sensor lead formed in the form of a film on the insulating layer mentioned above, and a giant magnetoresistive element disposed on the insulating layer in such a manner as to connect the terminal parts of the first sensor lead and the second sensor lead.

According to the mode of a more preferred embodiment, the detecting part mentioned above comprises a pair of elongate first sensor leads formed as separated substantially parallel to each other on a substrate, an insulating layer superposed in a covering manner on the pair of first sensor leads, a pair of elongate second sensor leads superposed as separated substantially parallel to each other on the insulating layer mentioned above, and a pair of giant magnetoresistive elements disposed on the insulating layer in such a manner as to connect respectively the terminal parts of the first sensor lead and the second sensor lead.

According to the mode of yet another preferred embodiment, the detector mentioned above which is used herein has a permanent magnet attached to the rear side thereof. By utilizing the permanent magnet for converging the magnetic flux, the detector is enabled to acquire further improvement in the sensitivity thereof. The detector, therefore, is capable of detecting the magnetic flux invariably when it is set in place not only in the groove part at the center of the rotor but also in the terminal part of the rotor and, as a result, the restriction imposed on the location of the detector can be relaxed.

BRIEF DESCRIPTION OF THE DRAWINGS

Other objects, features, and advantages of the invention will become apparent from the following description taken together with the drawings, in which.

DETAILED DESCRIPTION OF THE INVENTION

Figure 1:
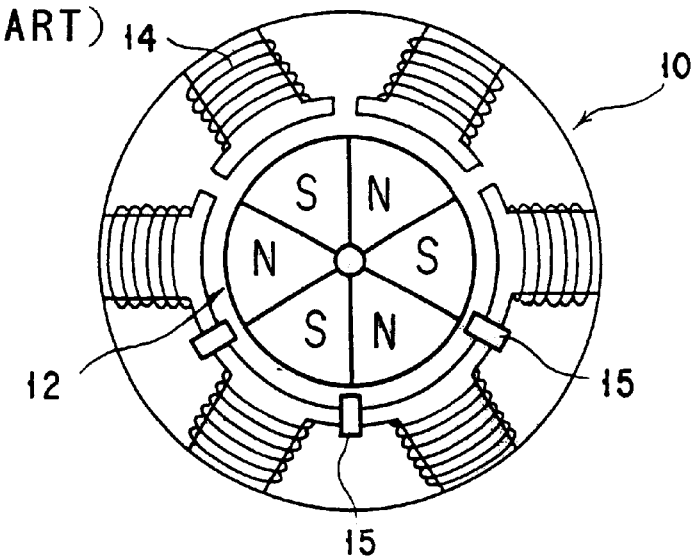
FIG. 1 is a diagram schematically illustrating the concept of a conventional brushless motor.

The present invention is characterized by utilizing as the rotational angle detector for a brushless or stepping motor a giant magnetoresistive sensor or a colossal magnetoresistive sensor.

The term "giant magnetoresistance (GMR) effect" as used herein refers to the magnetic particle dispersion type magnetoresistance effect reported by A. E. Berkowitz et al. in Phys. Rev. Lett. 68 (1992), p. 3745, and by J. Q. Xiao et al. in Phys. Rev. Lett. 68 (1992), p. 3749 or to the artificial lattice type giant magnetoresistance effect reported by M. N. Baibich et al. in Phys. Rev. Lett. 61 (1988), p. 2473 and by S.S.P. Parkin et al. in Appl. Phys. Lett. 58 (1991), p. 2710.

It is held that the magnetoresistance effects of these materials, as explained in Kataoka et al. "Materia", Vol. 33, No. 2 (1994), p. 165, are ascribable to the spin-dependent scattering of the electrons which bear the burdens of magnetization and conduction of a magnetic substance (precipitated particles or a multilayer film). Since these materials use Co, Ni, Fe, or alloys thereof as the magnetic substance, they bring no change in magnetization up to at least 300° C. and produce a large magnetoresistance effect.

The material manifesting the colossal magnetoresistance (CMR) effect is, for example, an oxide possessing an Mn-based perovskite structure represented by the formula, La(AE)MnO$_3$, wherein AE represents an alkaline earth metal Ca, Sr, or Ba. The study on this material was started in the era of 1950's [Landolt-Bornstein New Series III/4a (1970) III/12a (1978)]. In recent years, it has come to arrest special interest as a substance exhibiting a change in electric resistance from an insulator grade to a metal grade depending on a magnetic field at low temperature ["Materia", Vo. 35, No. 11 (1996), p. 1217].

The materials of this class are characterized by producing a change in magnetoresistance even in a magnetic field of not less than several kOe and, therefore, allowing measurement of a change of magnetic field due to the rotation of a rotor by having a sensor disposed inside a motor. Besides, these materials are characterized by requiring only two lead wires, i.e. just one half of the ordinary quantity required by the Hall element, and consequently simplifying the work of wiring and facilitating miniaturization of a device.

That is, the materials satisfy the three requirements, "miniaturization", "temperature characteristic", and "magnetic field characteristic", in the aforementioned total of four requirements which are imposed on the rotational angle sensor for the small brushless or stepping motor. They respond to the change of magnetic field at 300 Oe up to 5 kHz.

The preferred material for the magnetic particle dispersion type giant magnetoresistive element possesses a composition represented by the general formula: $NM_{100-x}TM_x$, wherein NM represents at least one element selected from among Ag, Cu, and Au, TM represents at least one element selected from among Fe, Co, and Ni, and x represents an atomic percentage in the range of $5 \leq \leq 45$, preferably $10 \leq x \leq 35$. Preferably, the magnetic particle dispersion type giant magnetoresistive element is formed of a material having particles, 5 to 500 nm in maximum major diameter, of the ferromagnetic material (TM) dispersed in the nonmagnetic (paramagnetic or diamagnetic) material (NM).

Preferably, the material for the artificial lattice type giant magnetoresistive element is composed of a nonmagnetic material (NM) comprising at least one element selected from among Ag, Cu, and Au and a ferromagnetic material (TM) comprising at least one element selected from among Fe, Co, and Ni. The artificial lattice type giant magnetoresistive element may be formed by alternately superposing the thin films of the nonmagnetic material and ferromagnetic material, each having a thickness of about 1 nm to about 10 nm, for example.

In the composition of the magnetic particle dispersion type giant magnetoresistive element represented by the general formula mentioned above or the material for the aforementioned artificial lattice type giant magnetoresistive element, the nonmagnetic material (NM) is allowed to incorporate therein up to 20 atomic %, preferably not more than 10 atomic %, of one or more other elements such as Al, Ti, Pd, Pt, and Rh. While these elements deteriorate the magnetoresistance effect and lower the sensitivity, Al and Ti which are capable of reducing the temperature dependency of the magnetoresistance effect and Pd, Pt, and Rh which are capable of increasing the electric resistance are effective in enlarging the magnetoresistance effect of the wHall sensor inclusive of the wiring. Similarly, the ferromagnetic material (TM) is allowed to incorporate therein such elements as Cr and Mn in a maximum of 5 atomic % in addition to Fe, Co, and Ni. Particularly, while Cr and Mn decrease the magnetoresistance effect, they are capable of preventing the magnetic particles from being coarsened and enhancing the heat resistance.

Preferably, the aforementioned colossal magnetoresistive element uses as a main component thereof a material possessing a composition represented by the general formula: $Ln_{1-y}AE_yMnO_{3-z}$, wherein Ln represents at least one element selected from among the rare earth elements, AE represents at least one element selected from among Ca, Sr, and Ba, and y and z respectively represent atomic ratios falling in the ranges of $0.2 \leq y \leq 0.4$ and $-0.1 \leq z \leq 0.3$, providing that not less than 95 atomic % of the material possesses the aforementioned composition). Particularly preferably, the material has strontium as the AE element mentioned above. It is also preferable to use La mainly as the rare earth element.

In the three species of materials mentioned above, it is proper to adopt the magnetic particle dispersion type giant magnetoresistive material and the artificial lattice type giant magnetoresistive material for the purpose of use in the brushless or stepping motor. This is because the colossal magnetoresistive material necessitates a heat treatment at elevated temperatures (700–900° C.) for enhancing the temperature characteristic thereof and consequently renders difficult the process of manufacture thereof and further because it has such high electric resistance as several k$\Omega$ and consequently allows no easy flow of electric current.

Now, the rotational angle detector for use in the brushless or stepping motor according to the present invention will be described below by reference to the drawings attached hereto.

Figure 5:
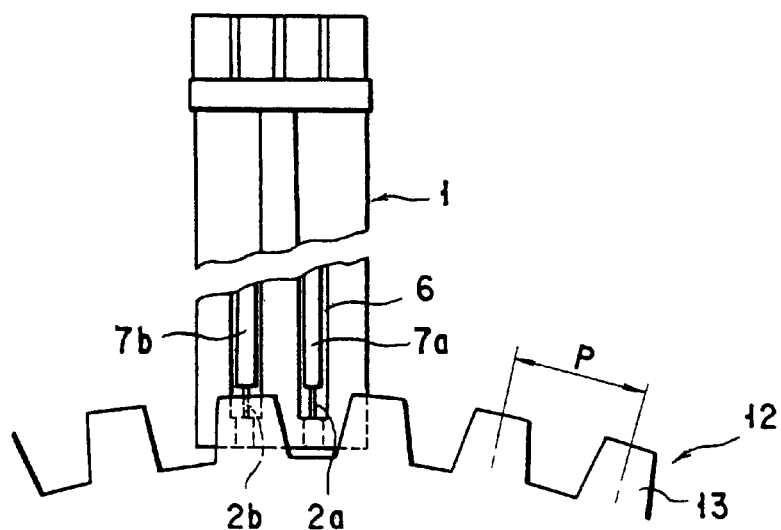
FIG. 5 is a fragmentary side view illustrating schematically the positional relation of a sensor probe to a rotor of a brushless or stepping motor to be assumed in the layout of a detector of the present invention.
Figure 6:
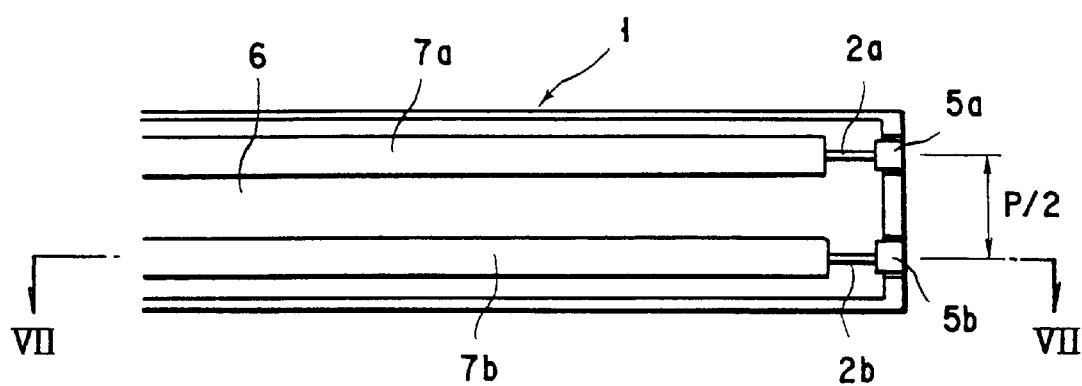
FIG. 6 is a fragmentary plan view of one embodiment of the sensor probe.

FIG. 5 illustrates the positional relation of a sensor probe 1 of the detector of the present invention to a rotor 12 of the brushless or stepping motor to be assumed in the layout thereof. FIG. 6 is a plan view of a detecting part of the sensor probe 1 and FIG. 7 is a cross section taken through FIG. 6 along the line VII—VII.

Figure 7:
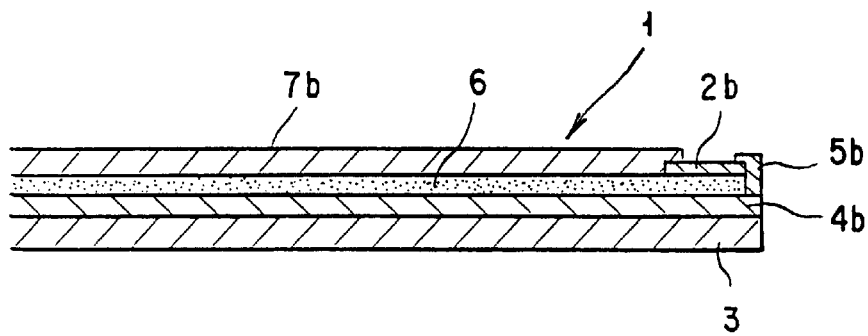
FIG. 7 is a cross section taken through FIG. 6 along the line VII—VII.

In FIG. 5 through FIG. 7, the reference numerals 2a, 2b represent a pair of giant magnetoresistive elements (sensor elements) which are formed of such a giant magnetoresistive material as mentioned above. As clearly depicted in FIG. 6 and FIG. 7, a pair of elongate first sensor leads 4a, 4b made of copper are formed as separated parallel to each other on a substrate 3 and projecting parts 5a, 5b similarly made of copper are integrally raised respectively from the leading ends of the first sensor leads 4a, 4b. An insulating layer 6 made of Al$_2$O$_3$ is superposed on the first sensor leads 4a, 4b in such a manner as to cover them. On the insulating layer 6 at the positions matching the first sensor leads 4a, 4b mentioned above, the pair of parallel giant magnetoresistive elements 2a, 2b are formed closely to the leading end of the sensor probe 1. A pair of elongate second sensor leads 7a, 7b made of copper are formed as separated parallel to each other in such a manner as to cover one end of the opposite terminal parts of each of the giant magnetoresistive elements 2a, 2b. The leading end side terminal parts of the giant magnetoresistive elements 2a, 2b are fixed by the folded parts at the upper terminals of projecting parts 5a, 5b of the first sensor leads 4a, 4b.

In the embodiment illustrated in FIG. 6 and FIG. 7, the interval between the pair of giant magnetoresistive elements 2a and 2b is set at a length equivalent to one half of the pitch P of the magnetic teeth 13 of the rotor 12 illustrated in FIG. 5.

Properly, the giant magnetoresistive elements 2a, 2b each have a rectangular shape measuring not more than 5 mm in length and not more than 0.5 mm in width.

The sensor leads mentioned above may be manufactured from such electroconductive materials as Al, Cu, Cr, Ta, or Mo or alloys thereof, particularly preferably Cu among other materials mentioned above. As the material for the insulating layer mentioned above, $Al_2O_3$, $SiO_2$, MgO, and other similar metal oxides may be used.

When the giant magnetoresistive sensors mentioned above are actually used as the rotational angle sensors for the brushless or stepping motor, the induced electromotive force from the lead wires due to an abrupt change in magnetic field should be avoided. For this purpose, a structure capable of exclusively detecting the magnetic field of the sensor part can be formed by superposing wires in such a manner as to reduce in size the loops in the wires which can be the cause therefor. Thus, a laminated structure having an insulating layer 6 such as of $Al_2O_3$ or MgO interposed between two electrodes (sensor leads 4a, 5a, and 7a or 4b, 5b, and 7b) which are connected to the opposite terminals of the giant magnetoresistive element (2a or 2b) is adopted. Properly, the insulating layer has a thickness of not less than 0.5 nm and not more than 1,000 nm, preferably not less than 10 nm and not more than 100 nm.

Figure 2:
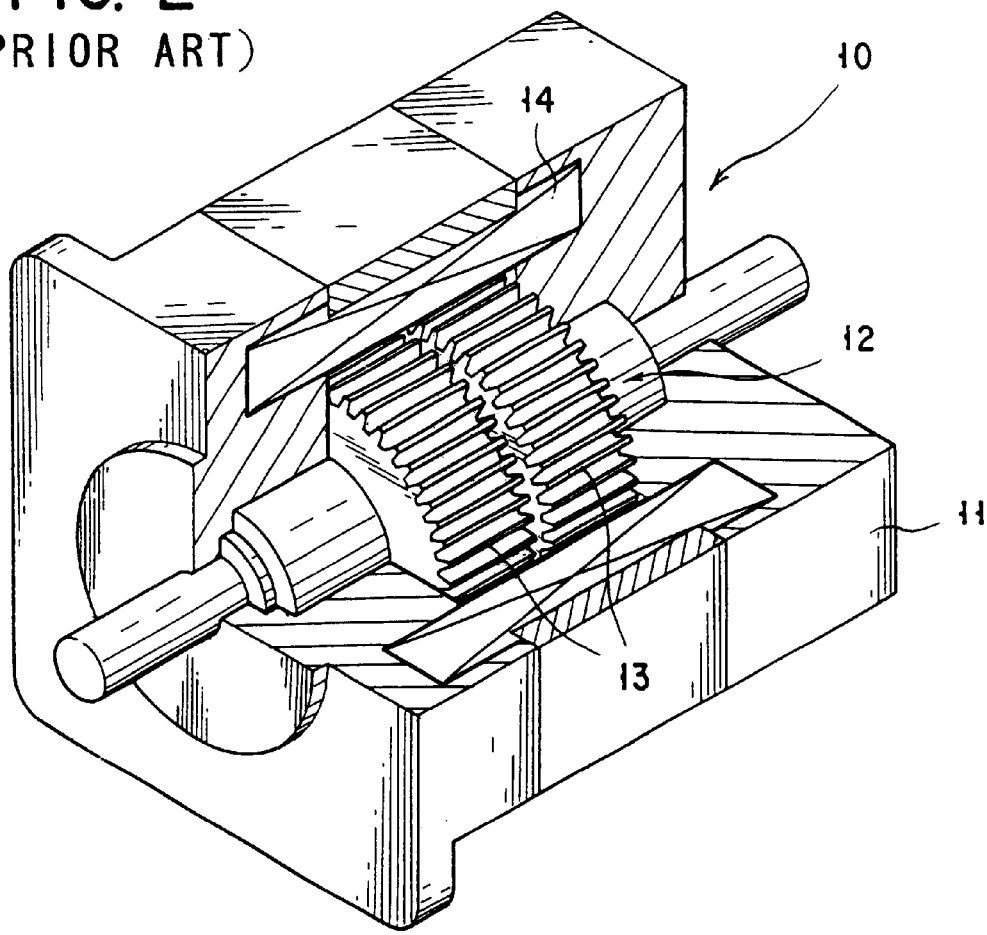
FIG. 2 is a partially cutaway perspective view schematically illustrating the construction of the conventional brushless motor.
Figure 3:
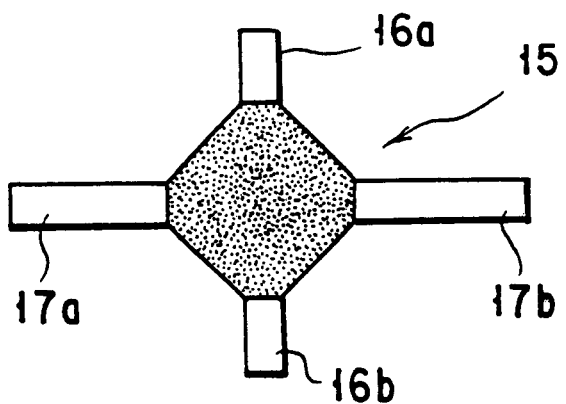
FIG. 3 is a diagram schematically illustrating the concept of a Hall element.
Figure 4:
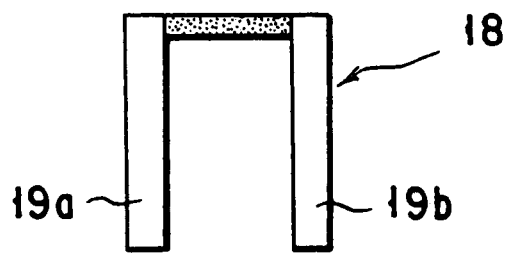
FIG. 4 is a diagram schematically illustrating the concept of a conventional magnetoresistive element.
Figure 9:
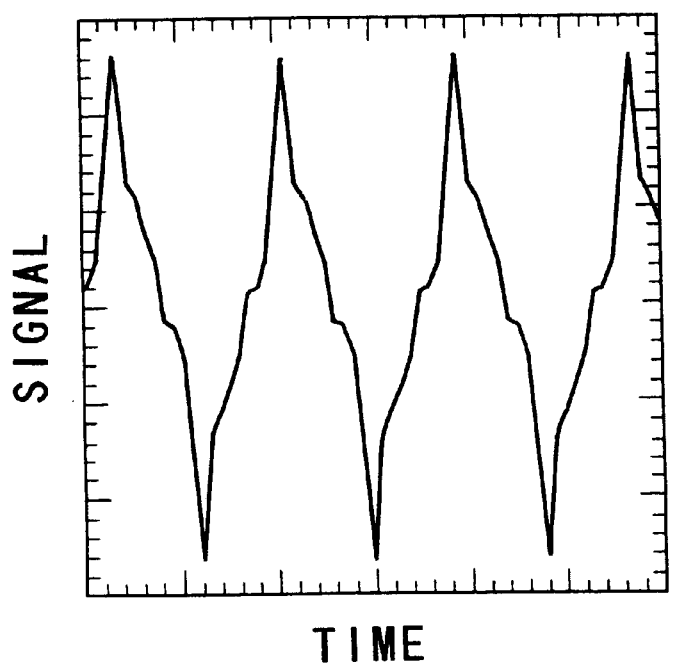
FIG. 9 is a graph showing the signal of the sensor element 2a of the sensor probe shown in FIG. 6.
Figure 10:
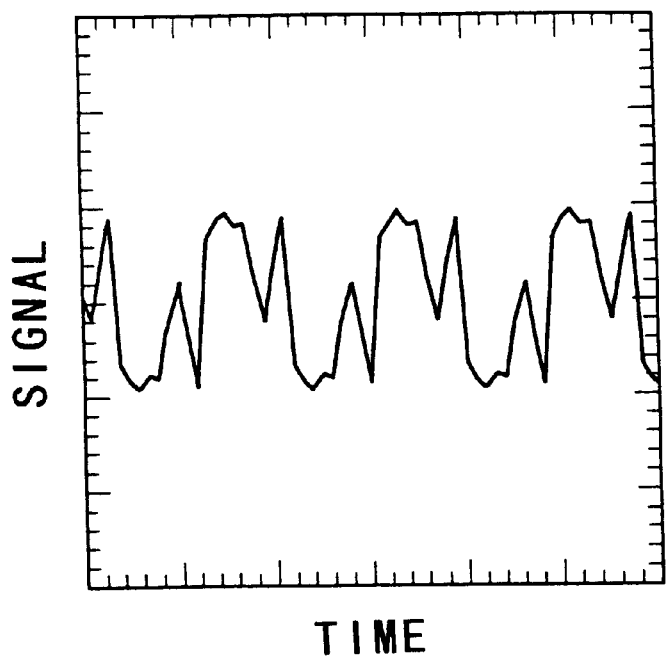
FIG. 10 is a graph showing the signal of the sensor element 2b of the sensor probe shown in FIG. 6.
Figure 11:
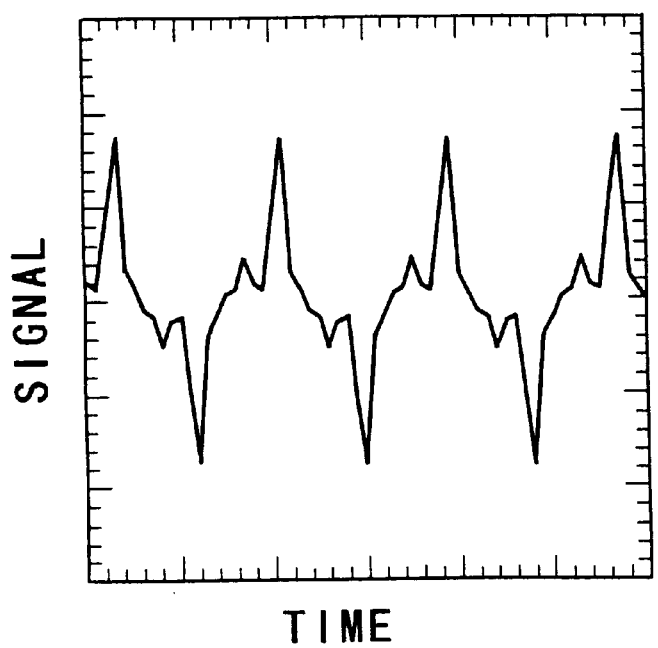
FIG. 11 is a graph showing the signal generated by a magnetic field of an exciting coil of a rotor.

Since not only the magnetic teeth 13 of the rotor 12 emit a change in magnetic field which is originally required to be detected but also the exciting coil 14 generates a magnetic field (FIG. 1 and FIG. 2), the magnetic sensors in the motor are fated to detect such complicated signals as shown in FIG. 9 and FIG. 10. These signals are unfit for the signal conditioning for detection of a rotational angle and are required to be transformed as much into sine waves as permissible. The magnetic field of the exciting coil 14 is emitted in the form of a pulse and made to form such a complicated signal as illustrated in FIG. 11. In consideration of the fact that the magnetic teeth 13 of the rotor 12 are periodic, the magnetic field of the exciting coil can be cancelled by disposing the sensor elements 2a, 2b in such a manner that they may assume their positions respectively at the tooth part and the recessed part of the magnetic teeth 13 of the rotor 12 as illustrated in FIG. 1 and then extracting the difference between the respective signals. Now, the mechanism of this cancellation of the magnetic field of the exciting coil will be described specifically below with reference to the accompanying drawings.

Figure 8:
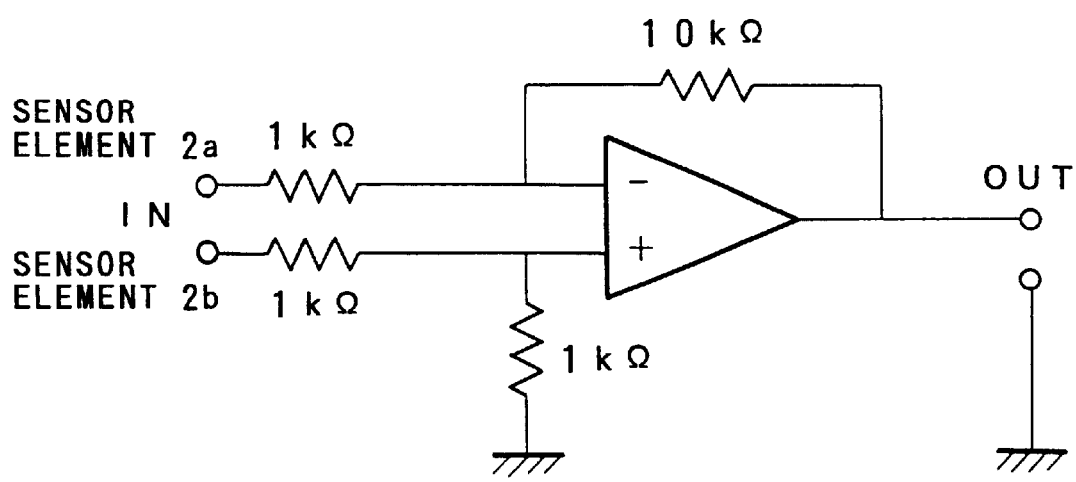
FIG. 8 represents a differential amplification circuit to be used for extracting the difference between the signals of a sensor element 2a and a sensor element 2b of the sensor probe shown in FIG. 6.

FIG. 8 represents a differential amplifying circuit to be used for extracting the difference of signals of the sensor element 2a and the sensor element 2b.

FIG. 9 depicts the signal from the sensor element 2a which comprises the signal generated by the magnetic field of the exciting coil 14 overlapping the signal from the magnetic teeth 13 of the rotor 12. FIG. 10 depicts the signal from the sensor element 2b which, similarly in the signal from the sensor element 2a, comprises the signal generated by the magnetic field of the exciting coil 14 overlapping the signal from the magnetic teeth 13 of the rotor 12. This signal, however, has a different shape because the signal from the magnetic teeth 13 of the rotor 12 is deviated by one half of the wavelength. At this time, the sensor element 2a and the sensor element 2b detect nearly equal signals, while the magnetic field of the exciting coil 14 generates such a complicated signal as depicted in FIG. 11.

Figure 12:
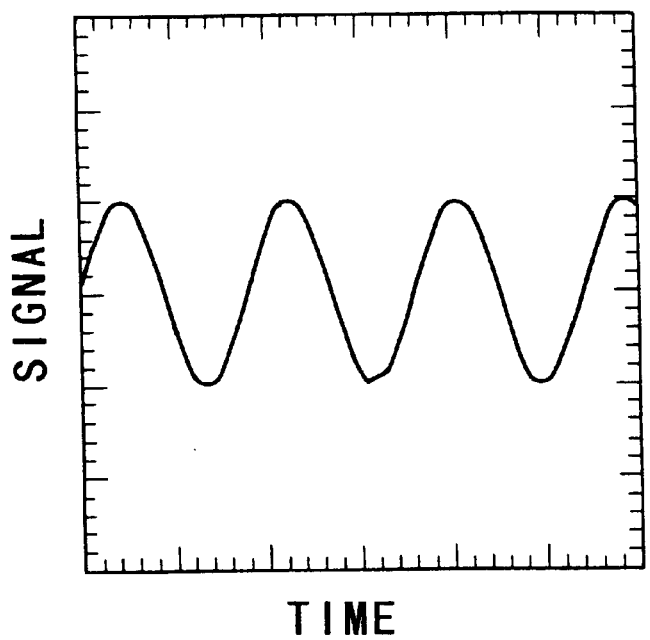
FIG. 12 is a graph showing the difference of the signals of the sensor element 2a and the sensor element 2b.
Figure 13A:
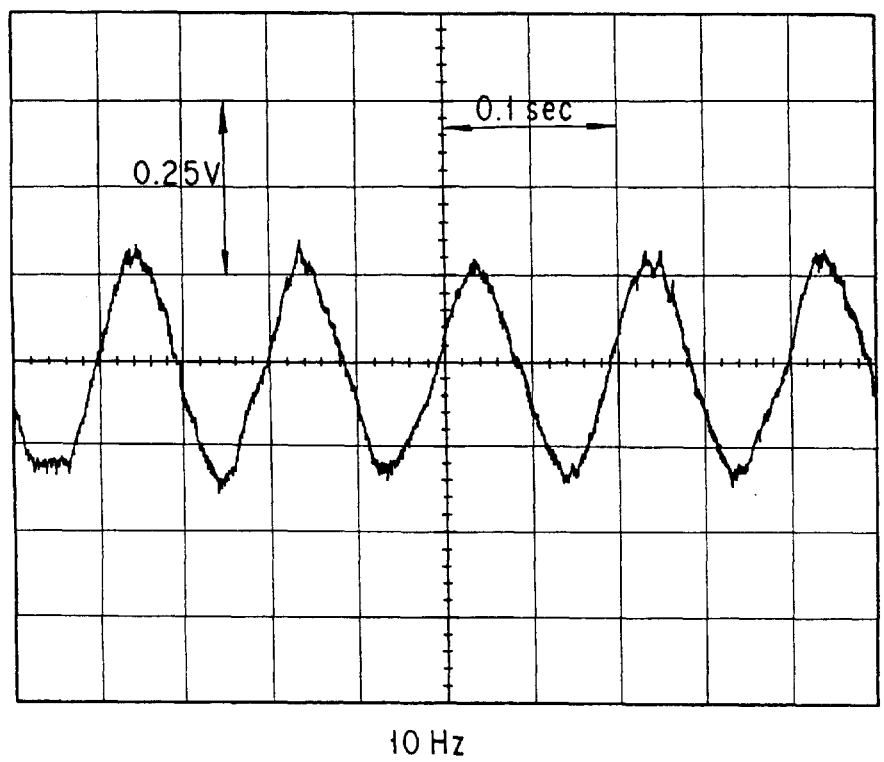
FIG. 13A through FIG. 13G are graphs showing the differences of the signals of the sensor element 2a and the sensor element 2b during the changes of magnetic field respectively of 10 Hz, 60 Hz, 100 Hz, 300 Hz, 500 Hz, 1 kHz, and 3 kHz obtained in the working examples.
Figure 13B:
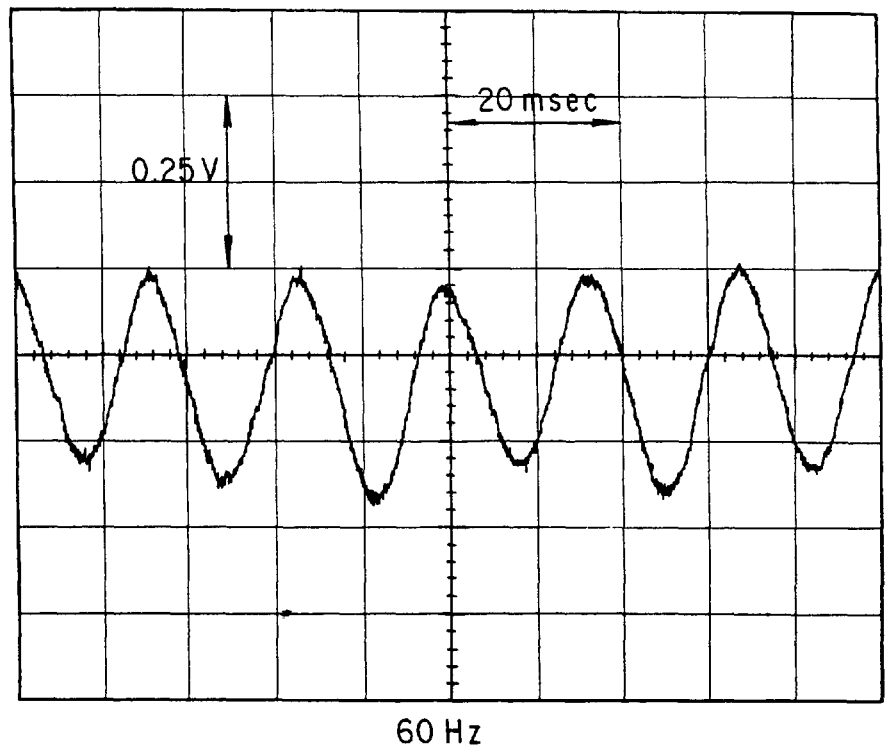
Figure 13C:
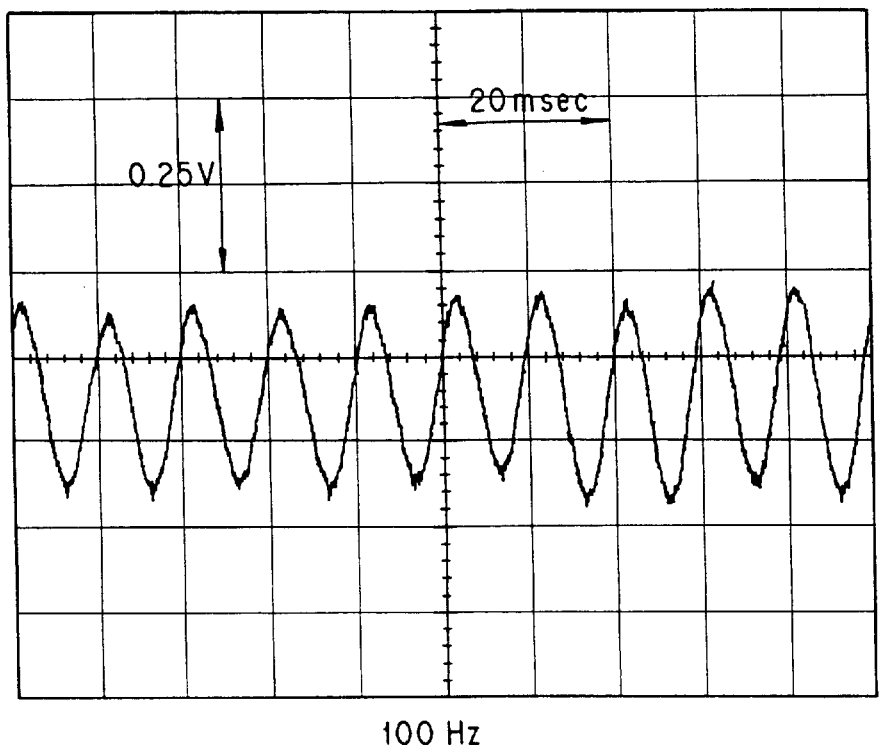
Figure 13D:
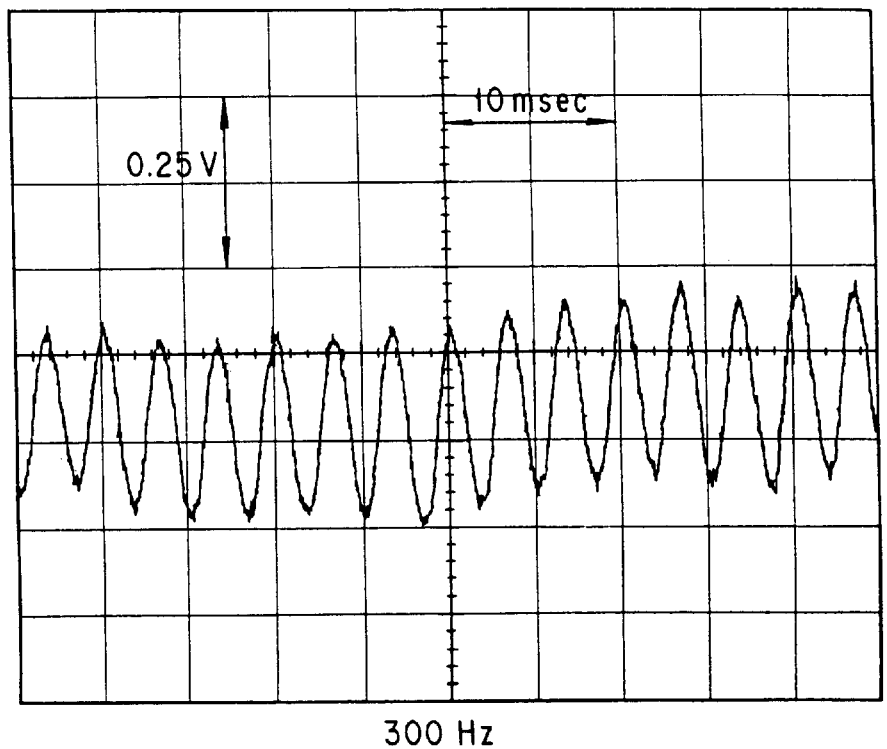
Figure 13E:
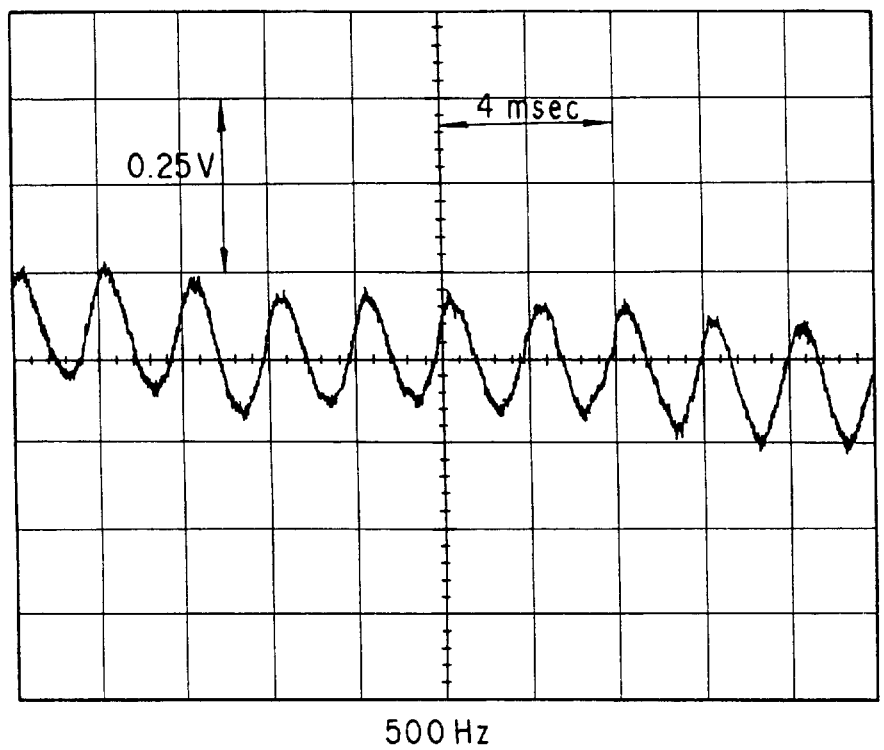
Figure 13F:
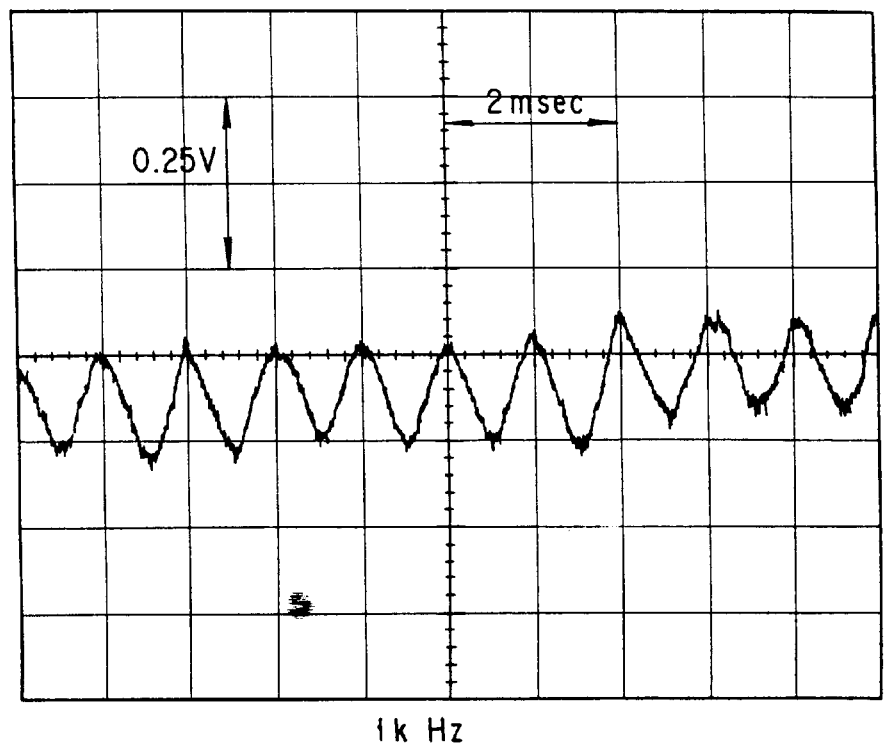
Figure 13G:
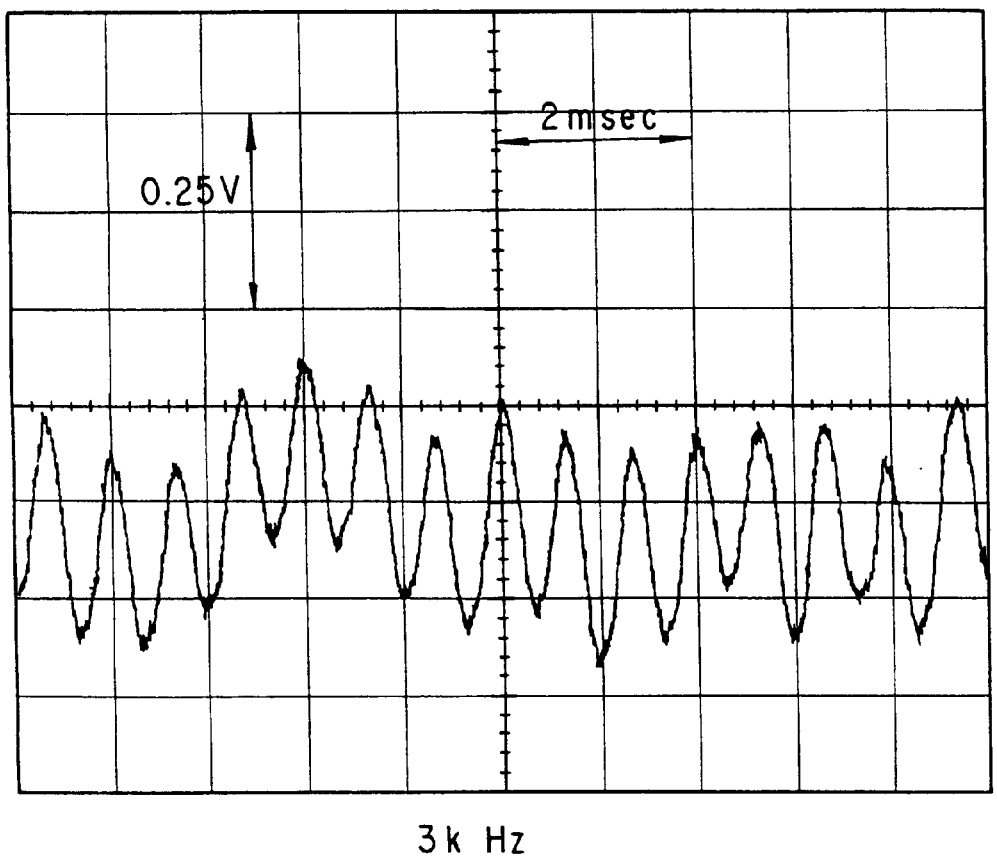

Because the signals from the rotor 12 which are detected respectively by the sensor elements 2a, 2b are deviated by a size equivalent to one half of the wavelength, namely they have opposite signs as described above and because the signals generated by the magnetic field of the exciting coil 14 are equal, it follows that the signals can be obtained exclusively from the magnetic teeth 13 of the rotor 12 as illustrated in FIG. 12 by extracting the difference of signals of the sensor element 2a and the sensor element 2b, and consequently the signals of rotation of the rotor can be conditioned as sine waves.

The operation of this nature can be obtained not only when the distance between the sensor element 2a and the sensor element 2b is set, as in the mode of embodiment described above, at ½ of the pitch P of the magnetic teeth 13 of the rotor 12 but also when it is set at $(2n+1)/2$, wherein n represents an integer inclusive of 0, such as, for example, 3/2, 5/2, . . . .

Now, working examples which had specifically demonstrated the effects of the present invention will be shown below.

The rotational angle detecting sensor was manufactured by the sputtering process as follows.

As the magnetic particle dispersion type giant magnetoresistive material, a composite target prepared by evenly distributing Co chips or $Ni_{0.66}Co_{0.18}Fe_{0.16}$ alloy chips on an Ag target or a Cu target was used.

The film-forming conditions and the heat-treating conditions were as follows:

Film-forming method: RF magnetron sputtering

Substrate: Si wafer

Substrate temperature: 100° C.

Atmosphere: Ar 0.6 Pa

Sputtering power: 100 W

Thin film composition: $Ag_{70}Co_{30}$ and $Ag_{75}(Ni_{0.66}CO_{0.18}Fe_{0.16})_{25}$ Film thickness: 10 nm Heat treatment:

Temperature: 200° C.

Duration: 0.5 hour

Atmosphere: Vacuum

Magnetoresistance effect: Magnetoresistance ratio of about 10% in a magnetic field of 10 kOe (the value found by the formula (1) mentioned hereinbefore)

A Cu/Co thin film exhibiting the artificial lattice type giant magnetoresistance effect was manufactured by alternately superposing the thin films of Cu and Co targets on a substrate by the RF sputtering process. The film-forming conditions were as shown below:

Film-forming method: RF sputtering

Substrate: Si wafer

Substrate temperature: 100° C.

Atmosphere: Ar 0.6 Pa

Sputtering power: 100 W (Co) and 100 W (Cu)

Number of layer superpositions: 20 (20 alternately superposed layers each of Cu and Co)

Layer thickness: Co (1.0 nm each) and Cu (1.0 nm each)

Heat treatment: None

Magnetoresistance effect: Magnetoresistance ratio of about 15% in a magnetic field of 10 kOe (the value found by the formula (1) mentioned hereinbefore)

Further, a thin film of $La_{0.67}Sr_{0.33}MnO_3$ exhibiting the colossal magnetoresistance effect was manufactured by the RF sputtering process. The target used herein was manufactured by sintering a compound, $La_{0.67}Sr_{0.33}MnO_3$, by the solid-phase reaction process.

Film-forming method: RF sputtering
Substrate: Si wafer
Substrate temperature: 500° C.
Atmosphere: Ar 2.4 Pa+$O_2$ 0. 6 Pa
Sputtering power: 100 W
Film thickness: 0.5 μm
Heat treatment:
Temperature: 500–900° C.
Duration: 0.5 hour
Atmosphere: Air
Magnetoresistance effect: Magnetoresistance ratio of about 5% in a magnetic field of 10 kOe (the value found by the formula (1) mentioned hereinbefore)

The thin films mentioned above were cut to manufacture rectangular giant magnetoresistive elements measuring 5 mm×0.5 mm and electrodes manufactured from a Cu electrode or a silver paste were connected one each to the opposite terminals of the elements mentioned above. The giant magnetoresistive elements were tested for change in magnetic field in the proximity of the relevant stepping motor, with due care exercised to avoid generation of an induced electromotive force by the wiring. The elements were found invariably to produce a change in electric resistance at varying magnitudes of magnetic field up to 5 kHz. In this case, the magnetic field of the exciting coil was detected in addition to the change in magnetic field of the magnetic teeth of the rotor.

Then, sensors were manufactured by having two giant magnetoresistive elements opposed to each other across a distance equivalent to one half of the pitch P of the magnetic teeth of the rotor as illustrated in FIG. 6 and FIG. 7. Here, in the various giant magnetoresistive materials available at all, the magnetic particle dispersion type giant magnetoresistive material, $Ag_{70}Co_{30}$, allowing easy manufacture was adopted. The film was formed by the conditions already described above. Since the pitch P of the magnetic teeth of the rotor used herein was about 0.5 mm, the distance between two sensor elements was set at about 0.25 mm by the use of a metal mask and the width of sensor element was set at about 0.1 mm, the length thereof at 1 mm, and the thickness thereof at 10 nm respectively.

The sensor constructed as described above was set in place in the proximity of the magnetic teeth 13 of the rotor 12 as illustrated in FIG. 5. At this time, the distance between the sensor and the rotor was set at about 0.1 mm. The magnetic field on the surface of the magnetic teeth of the rotor was about 300 [Oe].

The elements used herein had an electric resistance of about 20 Ω in the sensor part and a magnetoresistance effect of about 5%. By adopting these sensor structure, sensor layout, and leads arrangement, such nearly sine waves as would allow discrete recognition of the magnetic teeth of the rotor without receiving the signal of magnetic field of the exciting coil relative to the change of magnetic field ranging from 10 Hz through 3 kHz as illustrated in FIGS. 13A through 13G were obtained. By reading the sine waves, the rotational angle of the stepping motor could be measured exactly.

By using as the rotational angle detecting element for a brushless or stepping motor the magnetic particle dispersion type giant magnetoresistive element, the artificial lattice type giant magnetoresistive element, or the colossal magnetoresistive element as described above, the detection of a magnetic field even in a strong magnetic field as in the case of the conventional Hall element and the miniaturization of sensor can be realized. Further, since these giant magnetoresistive elements retain the magnetoresistance effect even at such high temperatures as 300° C., they can be used effectively in an atmosphere retained at elevated temperatures. By imparting to the detecting part a wiring structure which has superposed through the medium of an insulating layer two sensor leads connected to the opposite terminals of a giant magnetoresistive element, it is made possible to reduce the noise generated by the lead wires due to a change in magnetic field and, at the same time, attain miniaturization of the sensor. As a result, the controlling stepping motor can be further miniaturized than ever and, at the same time, the stepping motor having a magnetoresistive element built therein can be realized for the first time. By providing the detecting part mentioned above with two giant magnetoresistive elements opposed to each other across a distance equivalent to (2n+1)/2, wherein n represents an integer inclusive of 0, of the pitch of the magnetic teeth of the rotor, it is made possible to detect the differential signals of these two giant magnetoresistive elements as the rotational angle. As a result, the effect of the magnetic field received from the exciting coil serving to drive rotation can be reduced, the signals can be obtained exclusively from the magnetic teeth of the rotor, and the signals of rotation of the rotor can be conditioned as sine waves.

Figure 14:
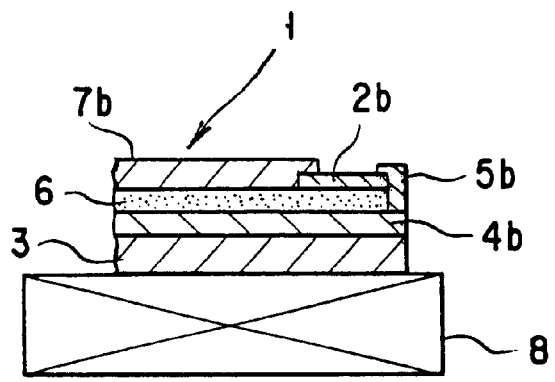
FIG. 14 is a fragmentary cross-sectional view of another embodiment of the sensor probe.

FIG. 14 illustrates another embodiment of the sensor probe according to the present invention. In this embodiment the sensor probe 1 has a permanent magnet 8 attached to the rear side of the substrate 3 thereof. By utilizing the permanent magnet 8 for converging the magnetic flux, the sensor is enabled to acquire further improvement in the sensitivity thereof. The sensor, therefore, is capable of detecting the magnetic flux invariably when it is set in place not only in the groove part at the center of the rotor 12 (FIG. 2) but also in the terminal part of the rotor 12 and, as a result, the restriction imposed on the location of the sensor can be relaxed.

While certain specific embodiments and working examples have been disclosed herein, the invention may be embodied in other specific forms without departing from the spirit or essential characteristics thereof. The described embodiments and examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. A brushless motor, comprising:
   a housing,
   a magnetic rotor having a plurality of magnetic teeth, and
   a giant magnetoresistive detector capable of reading a change in magnetic field of up to at least 10 kOe, said detector having a giant magnetoresistive element built in said housing as approximated closely to the magnetic teeth of said rotor thereby enabling the giant magnetoresistive element to read directly the rotational angle of the rotor.

2. The brushless motor according to claim 1, wherein said giant magnetoresistive detector is provided with a giant magnetoresistive element capable of reading an AC magnetic field of not less than 5 kHz as a signal.

3. The brushless motor according to claim 1, wherein said giant magnetoresistive detector is provided with two giant magnetoresistive elements disposed as separated by an interval equivalent to (2n+1)/2, wherein n represents an integer inclusive of 0, of the pitch of the magnetic teeth of the rotor so as to detect differential signals of said two giant magnetoresistive elements as the rotational angle.

4. The brushless motor according to claim 1, wherein said giant magnetoresistive detector includes a detecting part, wherein said detecting part of said detector is provided with a wiring configuration comprising a giant magnetoresistive element, two sensor leads connected one each to opposite terminals of said element, and an insulating layer interposed between said sensor leads.

5. The brushless motor according to claim 4, wherein said giant magnetoresistive element is a magnetic particle dispersion type giant magnetoresistive element which is formed of a material having ferromagnetic particles 5 to 500 nm in maximum major diameter dispersed in a nonmagnetic material.

6. The brushless motor according to claim 5, wherein said material possesses a composition represented by the following general formula:

$$NM_{100-x}TM_x$$

wherein NM represents at least one element selected from the group consisting of Ag, Cu, and Au, TM represents at least one element selected from the group consisting of Fe, Co, and Ni, and x represents an atomic percentage in the range of $5 \leq X \leq 45$.

7. The brushless motor according to claim 6, wherein said NM in the composition contains at least one element selected from the group consisting of Al, Ti, Pd, Pt, and Rh in an amount of up to a maximum of 20 atomic % and said TM in the composition contains at least one element selected from the group consisting of Cr and Mn in an amount of up to a maximum of 5 atomic %.

8. The brushless motor according to claim 4, wherein said detecting part comprises a substrate, an elongate first sensor lead formed on said substrate, an insulating layer superposed in a covering manner on said first sensor lead, an elongate second sensor lead formed on said insulating layer, and a giant magnetoresistive element disposed on said insulating layer in such a manner as to connect terminal parts of said first sensor lead and second sensor lead.

9. The brushless motor according to claim 4, wherein said detecting part comprises a substrate, a pair of elongate first sensor leads formed as separated substantially parallel to each other on said substrate, an insulating layer superposed in a covering manner on said pair of first sensor leads, a pair of elongate second sensor leads formed as separated substantially parallel to each other on said insulating layer, and a pair of giant magnetoresistive elements disposed on said insulating layer in such a manner to connect respectively terminal parts of said first sensor lead and second sensor lead.

10. The brushless motor according to claim 4, wherein said giant magnetoresistive element possesses a rectangular shape measuring not more than 5 mm in length and not more than 0.5 mm in width.

11. The brushless motor according to claim 4, wherein said insulating layer is formed of $Al_2O_3$, $SiO_2$, or MgO and has a thickness in the range of 0.5 to 1,000 nm.

12. The brushless motor according to claim 4, wherein said sensor leads are made of a material selected from the group consisting of Al, Cu, Cr, Ta, Mo and alloys thereof.

13. The brushless motor according to claim 4, which further comprises a permanent magnet disposed on a rear side of said detecting part.

14. The brushless motor according to claim 4, wherein said giant magnetoresistive element is an artificial lattice type giant magnetoresistive element which is formed of a material having a nonmagnetic material and a ferromagnetic material alternately superposed.

15. The brushless motor according to claim 14, wherein said nonmagnetic material is at least one element selected from the group consisting of Ag, Cu, and Au and said ferromagnetic material is at least one element selected from the group consisting of Fe, Co, and Ni.

16. The brushless motor according to claim 15, wherein said nonmagnetic material contains at least one element selected from the group consisting of Al, Ti, Pd, Pt, and Rh in an amount of up to a maximum of 20 atomic % and said ferromagnetic material contains at least one element selected from the group consisting of Cr and Mn in an amount of up to a maximum of 5 atomic %.

17. The brushless motor according to claim 4, wherein said giant magnetoresistive element is a colossal magnetoresistive element which is formed of the material having a composition represented by the following general formula:

$$Ln_{1-y}AE_yMnO_{3-z}$$

wherein Ln represents at least one rare earth element, AE represents at least one element selected from the group consisting of Ca, Sr, and Ba, and y and z respectively represent atomic ratios falling in the ranges of $0.2 \leq y \leq 0.4$ and $-0.1 \leq z \leq 0.3$.

18. The brushless motor according to claim 17, wherein said AE element is strontium.

* * * * *